(12) United States Patent
Jayaram et al.

(10) Patent No.: US 11,856,318 B2
(45) Date of Patent: Dec. 26, 2023

(54) METHODS AND SYSTEMS TO AUTOMATICALLY RECORD RELEVANT ACTION IN A GAMING ENVIRONMENT

(71) Applicant: MAIDEN AI, INC., Seattle, WA (US)

(72) Inventors: Vivek Jayaram, Seattle, WA (US);
Arjun Verma, Seattle, WA (US);
Brogan McPartland, Seattle, WA (US);
Vaikkunth Mugunthan, Cambridge, MA (US)

(73) Assignee: MAIDEN AI, INC., Seattle, WA (US)

( * ) Notice: Subject to any disclaimer, the term of this patent is extended or adjusted under 35 U.S.C. 154(b) by 0 days.

(21) Appl. No.: 17/731,005

(22) Filed: Apr. 27, 2022

(65) Prior Publication Data
US 2022/0345660 A1 Oct. 27, 2022

Related U.S. Application Data

(60) Provisional application No. 63/180,235, filed on Apr. 27, 2021.

(51) Int. Cl.
*H04N 5/77* (2006.01)
*G06T 7/73* (2017.01)
(Continued)

(52) U.S. Cl.
CPC .............. *H04N 5/77* (2013.01); *G06T 7/73* (2017.01); *G06V 20/42* (2022.01);
(Continued)

(58) Field of Classification Search
None
See application file for complete search history.

(56) References Cited

U.S. PATENT DOCUMENTS 9,036,864 B2 5/2015 Johnson et al.
9,094,615 B2 7/2015 Aman et al.
(Continued)

FOREIGN PATENT DOCUMENTS

CN 111866575 A 10/2020
EP 3798978 A1 3/2021
(Continued)

OTHER PUBLICATIONS

R. Hartley and A. Zisserman, Multiple View Geometry in Computer Vision, Cambridge University Press, second edition, 2003. (Year: 2003).*

(Continued)

*Primary Examiner* — Hung Q Dang
(74) *Attorney, Agent, or Firm* — Davis Wright Tremaine LLP

(57) ABSTRACT

Systems and methods are described for detecting a triggering event in a gaming environment and recording a segment of video. In some aspects, the method may include obtaining a camera projection matrix associated with the gaming environment that correlates points in the gaming environment between a two-dimensional pixel space and a three-dimensional physical representation. An input video may be obtained from the gaming environment. Pose coordinates, including two-dimensional pixel space location, of a body part of a person in the input video may be estimated, and converted to three-dimensional pose coordinates using the camera projection matrix. A person of interest having a body part located within a region of interest in the gaming environment may be identified to determine if a triggering event has occurred. Storage of an input video segment that includes the trigger movement may be initiated on a storage device in communication with the user device.

19 Claims, 9 Drawing Sheets

(51) Int. Cl.
　　　*G06V 20/40*　　(2022.01)
　　　*G06V 40/20*　　(2022.01)
　　　*H04N 5/91*　　(2006.01)
　　　*H04N 17/00*　　(2006.01)
　　　*H04N 23/63*　　(2023.01)

(52) U.S. Cl.
　　　CPC ............... *G06T 2207/10016* (2013.01); *G06T 2207/20081* (2013.01); *G06T 2207/20084* (2013.01); *G06T 2207/30196* (2013.01); *G06T 2207/30221* (2013.01)

(56) References Cited

U.S. PATENT DOCUMENTS

| | | | |
|---|---|---|---|
| 10,489,656 | B2 | 11/2019 | Lee et al. |
| 11,045,705 | B2 | 6/2021 | Zhang |
| 11,157,742 | B2 | 10/2021 | Zhang et al. |
| 2010/0123830 | A1 | 5/2010 | Vunic |
| 2013/0039538 | A1 | 2/2013 | Johnson et al. |
| 2015/0260512 | A1 | 9/2015 | Greiner et al. |
| 2015/0373258 | A1* | 12/2015 | Chuang .............. G06V 10/7515 348/333.04 |
| 2017/0256066 | A1 | 9/2017 | Richard et al. |
| 2018/0322671 | A1 | 11/2018 | Song |
| 2019/0141297 | A1* | 5/2019 | Vaidya ................. G11B 27/036 |
| 2019/0147219 | A1 | 5/2019 | Thornbrue et al. |
| 2020/0043287 | A1* | 2/2020 | Zhang ................. G06V 40/103 |
| 2020/0151903 | A1* | 5/2020 | Lee ........................... G06T 7/73 |
| 2020/0226386 | A1* | 7/2020 | Chuang ............... G06V 40/103 |
| 2020/0298080 | A1 | 9/2020 | Zhang |
| 2020/0368616 | A1 | 11/2020 | Delamont |
| 2021/0192783 | A1* | 6/2021 | Huelsdunk .............. G06T 7/246 |
| 2022/0138969 | A1 | 5/2022 | Forsgren et al. |

FOREIGN PATENT DOCUMENTS

| | | |
|---|---|---|
| WO | 2007035878 A2 | 3/2007 |
| WO | 2020033612 A1 | 2/2020 |
| WO | 2021119462 A1 | 6/2021 |

OTHER PUBLICATIONS

International Search Report and Written Opinion dated Aug. 19, 2022, Patent Application No. PCT/US2022/026579, 12 pages.
International Search Report and Written Opinion dated Aug. 5, 2022, Patent Application No. PCT/US2022/026575, 10 pages.
Wu et al., 'Multi-camera 3D ball tracking framework for sports video', IET Image Processing, 2020, vol. 14, No. 15, [retrieved onSep. 20, 2022], Retrieved from: <URL: https://ietresearch.onlinelibrary.wiley.com/doi/10.1049/iet-ipr.2020.0757>. Feb. 11, 2021, 11 pages.
Chen et al., "Ball Tracking and 2D Trajectory Approximateion with Applications to Tactics Analysis From Single-Camera Volleyball Sequences," Multimedia Toold and Applications 60.3, Jun. 21, 2011, 27 pages.
Chen et al., "Physics-Based Ball Tracking and 3D Trajectroy Reconstruction with Applications to Shooting Location Estimation in Basketball Video," Journal of Visual Communication and Image Representation 20.3, 2009, 13 pages.
Chen, "Geometry-Based Camera Calibration Using Five-Point Correspondences From a Single Image," IEEE Transaction on Circuits and Systems for Video Technology, Dec. 2017, 12 pages.
Gomez-Gonzalez, et al., "Reliable Real-Time Ball Tracking for Robot Table Tennis," Robotics, Oct. 22, 2019, 13 pages.
International Search Report and Written Opinion dated Jan. 17, 2023, Patent Application No. PCT/US2022/076975, 9 pages.
Kamble et al., "Ball Tracking in Sports: a Survey," Artifical Intelligence Review (2019), Oct. 16, 2017, 51 pages.
Parisot et al., "Consensus-Based Trajectory Estimation for Ball Detection in Calibrated Cameras Systems," Journal of Real-Time Image Processing, Sep. 22, 2016, 16 pages.

* cited by examiner

METHODS AND SYSTEMS TO AUTOMATICALLY RECORD RELEVANT ACTION IN A GAMING ENVIRONMENT

CROSS-REFERENCE TO RELATED APPLICATIONS

This application claims the benefit of U.S. Provisional Patent Application No. 63/180,235, filed Apr. 27, 2021, the disclosure of which is incorporated herein by reference in its entirety.

BACKGROUND

Currently, to review video footage of oneself playing a sport, one must set up (on a tripod or elsewhere) their video camera or phone camera and start recording. In many sports, (such as cricket, baseball, tennis, or golf), actual sporting action comprises less than 15% of total time. If, after their session, players would like to view all their relevant shots/hits/plays at the end of the session, they must scroll through a long, space-intensive, video to find the moments of actual action. In order to delete the generally 85% of action-free time, one must manually edit the long video and save each short video of relevant action, which may take hours. There do exist services that allow the user to upload or process their video after recording a full session to find interesting segments. However, the recorded video can be several gigabytes for an hour long session, and storing/uploading this to third party service can be quite burdensome. It is also often not even possible to record several hours of footage on many mobile devices due to memory constraints of these devices. Other solutions use hardware that interacts with the gaming environment such as sensors on the bat or ball, in order to trigger the filming of video. Such sensors are expensive and intrusive. The inability to automatically record relevant action often deters people from engaging in sports filming for long periods. In a world where film review and analytics in sports has become not only conducive to skill development but also social interaction, the ability to inexpensively and conveniently review sporting video has become increasingly relevant.

In view of the foregoing, a need exists for an improved video review system and method for automatic recording and storage of only action time in an effort to address one or more of the aforementioned obstacles and deficiencies of conventional sports filming and reviewing systems.

BRIEF DESCRIPTION OF THE DRAWINGS

Various techniques will be described with reference to the drawings, in which.

DETAILED DESCRIPTION

Figure 1:
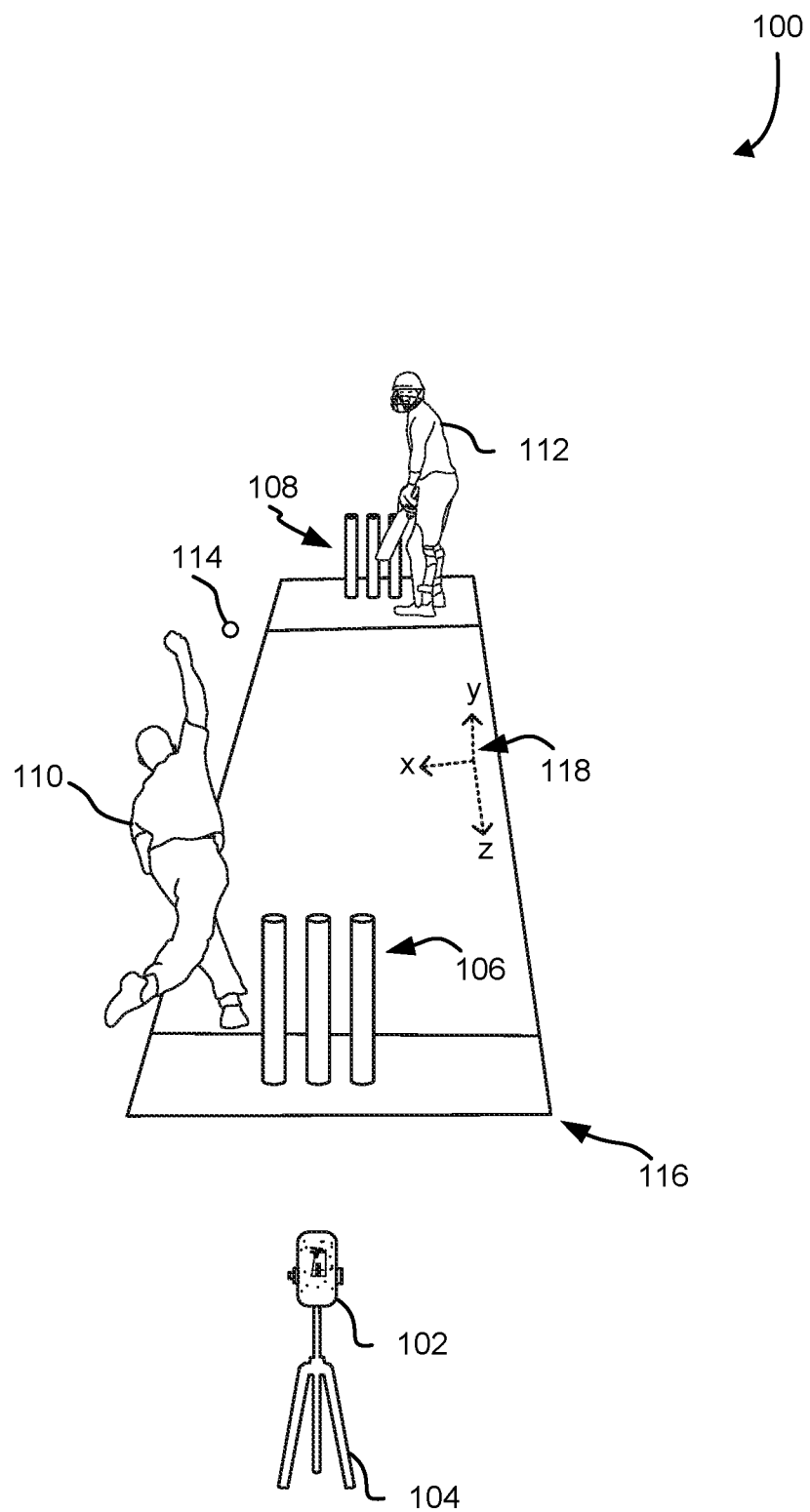
FIG. 1 illustrates an example a gaming environment in which the described techniques may be implemented, according to at least one embodiment.

Systems and methods are described herein for recording and saving segments of video based on events detected in the video that indicate the chunk or segment of video is of particular interest. In various embodiments, an automatic action detection technology addresses one or more of the aforementioned problems by automatically detecting and storing only relevant action time from a video, such of a sport in a gaming environment (e.g., cricket, baseball, football, basketball, or the like). In some examples, a system can continuously analyze frames coming from an image capture device without storing them (or only storing such frames temporarily for analysis), and when certain criteria are met, the system can record and store video for a fixed duration of time.

In some examples, input video of the gaming environment may be recorded by a camera of a user device, such as one or more cameras of a smartphone. As used herein, a single camera may refer to one or more cameras that are co-located, such as one, two, or three, etc., cameras that are all part of the same camera or device but are collocated. The input video may include a plurality of frames of the gaming environment, such as a ball moving in the gaming environment, such as captured at 30 frames per second (FPS), but which may also be captured at higher rate, such as 60 FPS, 90 FPS, 240 FPS, etc. In some cases, one or more segments or chunks of the video may only be saved, such as for a fixed period of time after the recording, if the segment meets a set of conditions, such that the segment of video is deemed noteworthy. In some cases, a segment of video may be deemed noteworthy for more permeant recording and saving when an action of interest takes place in the video segment.

For example, in some embodiments, a process for detecting action items and saving segments of video, such as of or relating to a gaming environment, may include calibrating a camera to compute a camera projection matrix. A camera projection matrix mapping between 2D image coordinates and 3D real world coordinates may either be derived or obtained. In some cases, the camera projection matrix may be derived or generated by identifying a number of points (e.g., 2, 4, 6, 8, etc.,) in the gaming environment that have a fixed dimensional relationship with each other or a known position relative to other objects in the gaming environment (e.g., a player). These points may be correlated between a two-dimensional pixel space representation and a three-dimensional physical representation. In the example of cricket, the points may include identifying locations of the batter and bowler stumps (e.g., the tops and bottoms of each of the stumps), as these are at a known distance from one another. Using these real-world distances, a correlation or mapping between 2D pixel space of a given frame of the video can be mapped to real world coordinates in 3D.

Before, concurrently, or after determining the camera projection matrix, humans or players may be identified in video or frames of the gaming environment, such as by using one or more computer vision processes or algorithms. This may be referred to throughout as pose estimation. In some cases, the computer vision process or pose estimation algorithm may be developed and/or selected for a given gaming environment, such as for different sports, etc. Next, a 3D or real-world location of at least one identified human may be determined based on or using the camera projection matrix, to convert or map a 2D pixel location of a human or a part thereof, identified in the frame or frames of the captured video. The projection matrix can allow the system to project a 2D point onto a 3D plane, which can provide an estimation of the real-world location of the 2D image point. In one embodiment, the 2D point used to estimate location is the 2D pose coordinate of the foot of an identified person, which is projected onto the ground plane of the real-world coordinate system; however, another body part in other embodiments or other 3D planes may be used to a similar effect.

Various embodiments can include determining whether the estimated locations of an identified person or persons are in a predefined region of interest (ROI) for at least one frame of the input video. Such regions can be defined based on a given sport, sporting environment, or the like. For instance, in baseball, the pitcher pitches from near the mound and the ROI could be a circle of defined radius on the ground plane with the mound as the center. If a person's 3D real-world location is estimated to be within the ROI, the person can be defined as a person of interest (POI). If a frame of the video contains at least one POI, the frame can be defined as a frame of interest (FOI).

Next, the pose coordinates of a POI many examined and classified across a subset of frames, including at least the FOI, as a trigger or non-trigger movement, to determine if a video segment (of a configurable or automatically detected length) should be recorded and saved for later access. Such a trigger movement can be identified in some examples by performing a machine learning algorithm that compares the pose coordinates of the POI in a subset of frames of the input video to periodic, predictable poses of persons in the real-world when they perform movements that trigger the beginning of a play/shot/hit in the particular sport.

In some embodiments, a system can use simple heuristics on the body pose without requiring machine learning. For example, a body position could be classified as a pitching trigger movement by simply identifying whether the hand is above the head. Such a method may not require training data or machine learning, but in some examples may require known heuristics about the sport and the desired trigger movement.

In yet some cases, a frame may be classified as a frame-of-interest without directly requiring the pose coordinates of a human or the camera projection matrix. In one such embodiment, a neural network such as a convolutional neural network, may be used directly on each frame or a sequence of frames to predict whether a given frame represents the start of a trigger movement.

In some cases, the described video chunking techniques may be utilized in connection with 3D ball track generation techniques, as described in co-pending U.S. application Ser. No. 17/730,865, titled "METHODS AND SYSTEMS TO TRACK A MOVING SPORTS OBJECT TRAJECTORY IN 3D USING A CAMERA," the contents of which are hereby incorporated by reference in their entirety.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) more efficient utilization of computing resources to capture and save video segments of interest, rather than a long video segment that contains a large volume of irrelevant video (2) faster and more efficient retrieval of video segments of interest and (3) other advantages as will be made apparent in the rest of this disclosure. As will be appreciated by the remainder of this disclosure, the described systems and techniques provide for a widely adaptable and intuitive system for use in various gaming environments.

FIG. 1 illustrates an example diagram 100 of a device/system 102, in a gaming environment, that can be used to detect actions of events of interest in the gaming environment and save those actions of interest in segments of video for later access. Example diagram 100 depicts part of a cricket field 116, including bowler and batter stumps 106, 108, a player in the bowling positing 110, a batter 112 and a ball being thrown 114 by the bowler 110.

As described in greater detail herein, a camera device 102 may be positioned proximate to the gaming environment or field 116 to capture actions or events within the gaming environment 116. Frames of the video may be analyzed to detect actions or events of interest, using the techniques described herein, whereby separate segments, such as of a fixed or configured length may be record and save in a more permanent state for later access. As illustrated, in some examples, a camera or smartphone 102 may be positioned anywhere near a gaming environment 116, such as using a tripod or other stabilization device 104.

An example coordinate system is also shown in the image via direction con 118. The arrows point in the positive direction for each axis. All real-world units are described herein in meters, however other measurement systems (e.g., standard), can be used to similar effect. In one example, the origin may be the center of the pitch on the ground. This point for the origin may be selected to provide symmetry for the gaming environment. The X axis may be aligned sideways or perpendicular to the direction of the throw of the ball (leg side vs offside). The Y axis may represent the vertical direction, where positive is above the ground. The Z axis may represent the direction of the throw of the ball, where positive is towards the direction of the bowler or batter. It should be appreciated that other coordinate system may be used to a similar effect.

As used herein, a video or video input is a finite set of frames (images) displayed quickly in sequence to create the illusion of continuity (or smoothness). The level of smoothness depends, largely, on the Frame Rate of the camera being used. Frame Rate is measured in frames per second (fps). The default setting on typical smartphones is usually 30 fps or 60 fps, but modern phones are also capable of higher frame rates which are used in features such as slow-motion video (usually 240 fps). In some aspects, the described models are built to run with feasible accuracy at 30 fps (which saves phone storage and battery), but they can also run at higher frame rates, which would increase the accuracy further. Furthermore, images themselves are just a grid of pixels e.g. 1280×720, each having an RGB (Red, Green, Blue) value. Therefore, a video can be represented as a list of frames, which is a 2D array of pixel values. For example, a 5 second video at 720p and 30 fps will be a (1280×720×3×150) sized array of numbers.

It should be appreciated that a cricket gaming environment is only given by way of example, and that the described systems and techniques can be adapted and applied to various other gaming environments including baseball, football, soccer, basketball, and various other gaming environments that utilize a ball or other small moving object where analysis of the movement of such a ball or object would be useful.

Figure 2:
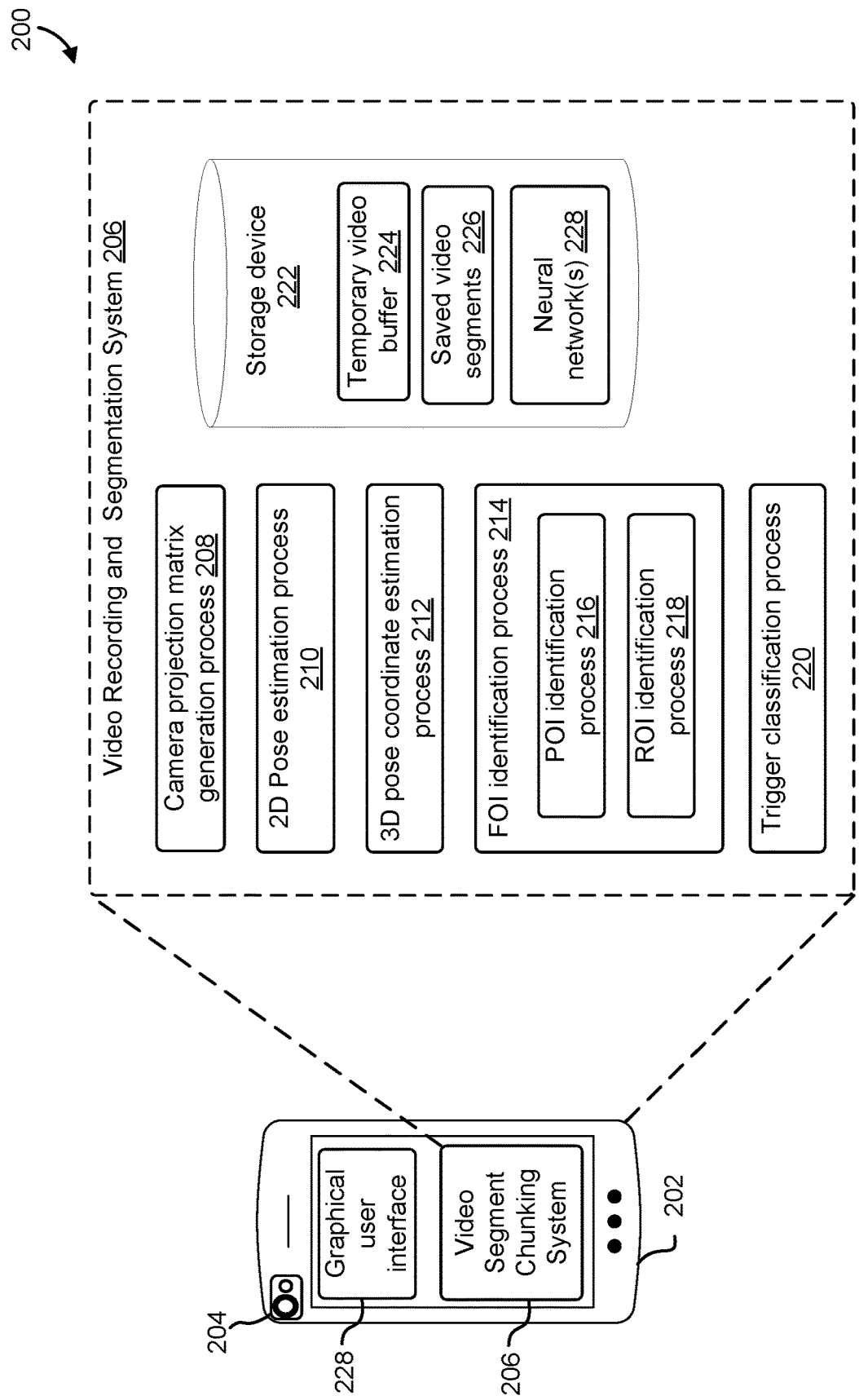
FIG. 2 illustrates an example video segment chunking system, according to at least one embodiment.

FIG. 2 illustrates diagram 200 of an example video recording and segmentation system 206 in communication with a user/camera device 202. As illustrated, a user device 202, such as a smartphone or other computing device (e.g., laptop, tablet, or even a desktop computing device), may include or be connected to or in communication with a camera device 204. Camera device 204 may include one or more video or image capturing devices. The user device 202 may also include a graphical user interface 228, which may display images or video captured by the camera device 204, such as when taking a video or image, and may access and display recorded video segments.

In some cases, the user device 202, such as through the camera device 204, may capture video of an action in a gaming environment, such as a pitch or throw of a ball, and may, utilizing a video recording and segmentation system 206 to detect actions of interest, record video segments of a finite or fixed length including the action(s) of interest, and save those video segments individually such that they may be individually accessed at a later time for playback, such as through the GUI 228 of the user device 202.

As illustrated, the video recording and segmentation system 206 may be a collection of computing resources that can process video input and output one or more video segments that capture or include actions or event so of interest that occurred within the gaming environment. In some cases, one or more components of the video recording and segmentation system 206 may include hardware resources, software resources, and/or could computing resources, or any combination thereof. In some cases, the video recording and segmentation system 206 may be provided by one or more servers that are in communication with the user device 202. In other cases, the video recording and segmentation system 206 or components thereof may be provided by one or more cloud or virtual computing resources, such as virtual machines, containers, etc., virtual databases, etc. In yet some cases, some or all of the video segment chunking system 506 may be provided by the user device 502, whereby zero to some of the processes performed by the video segment chunking system 506 may be done in conjunction with various eternal resources over one or more networks.

As illustrated, video recording and segmentation system 206 may include a camera projection matrix generation process 508, which may also be generally referred to as a camera calibration process. In some cases, the camera projection matrix generation process 208 may be a process executed by the video recording and segmentation system 206 to align or map elements in a 2D captured frame or frames to a 3D real world representation of those elements.

Camera calibration is the process of localizing real world points based on the 2D content in an image. The goal is to solve for the camera parameters (location in 3D, rotation, zoom) by identifying points like the stump and pitch where their real-world location is known relative to each other or other important objects or point in a given game. In some aspects, various techniques for performing camera calibration, as are known in image process and computer vision arts, can be used on video data/frames of a gaming environment to map 2D points captured by a video camera to an accurate 3D representation of the events captured.

In some aspects, camera calibration and processes therefore, may be equivalent to finding a projection matrix which converts a 3D point in meters to a 2D point in pixels, using techniques that are known in the art. For example, assume a 3D point (0, 0, 0), which may represent the middle of the pitch on the ground:

$$x \in R^3$$

With a projection matrix C, the 3D point can be projected to a 2D image point y, i.e., (0,0), which may refer to the top left of the image, where (720, 1280) may refer to the bottom right of the image, which is provided by the following equations:

$$y = C * x = \text{Projection}(x)$$

$$C = x^\wedge(-1) * y$$

While this is an oversimplified explanation of determining a projection matrix, (e.g., in some aspects, the process includes more than matrix multiplication), there are a few more steps, but consider this as the projection function, which will be explained in more detail below.

The top and bottom of the stumps may be used as "keypoints". This is because there are well-defined locations for these points in meters (e.g., bottom of striker middle stump is (0, 0, −10.06) in a 3D coordinate system).

In some aspects, to detect the stumps, a U-Net convolutional neural network or other convolutional neural network may be trained to predict the top and bottom of the stumps. The U-Net convolutional neural network may supplement a usual contracting network by successive layers, where pooling operations may be replaced by up-sampling operators. Hence these layers increase the resolution of the output. A successive convolutional layer can then learn to assemble a precise output based on this information. One modification in U-Net is that there are a large number of feature channels in the up-sampling part, which allow the network to propagate context information to higher resolution layers. As a consequence, the expansive path is more or less symmetric to the contracting part, and yields a u-shaped architecture. The network only uses the valid part of each convolution without any fully connected layers. To predict the pixels in the border region of the image, the missing context is extrapolated by mirroring the input image. This tiling strategy is important to apply the network to large images, since otherwise the resolution would be limited by the GPU memory.

In some cases, the exact number of data points needed to train a Computer Vision model like this varies, but 10000 data points across a diversity of settings (backgrounds, colors, lightings, etc.) is used as a rule of thumb, in some examples. In one example, where 4000+ data points have been used for training, the resultant model works out-of-the-box in settings that are not similar to ones it has been trained on. As more data is collected and annotated, the model or models may become exceedingly more robust.

In an embodiment, system/process 208 can calibrate a camera to compute a camera projection matrix which can provide a mapping from points in the actual real-world 3D environment of the camera to 2D points on the screen of the camera/phone. By automatically identifying objects in the gaming environment which are of known sizes and distances from each other, various examples are able to compute this projection matrix. Such objects or markings may include court lines or gaming objects such as hoops, goals, bases, or wickets. The act of computing a camera projection matrix can be done in various suitable ways. For instance, in some embodiments, automatic identification of objects of previously known dimensions is not necessary. In various embodiments, a user may tap on various places on a 2D screen to manually input where certain objects are and then this input can be used to compute a projection matrix. However, in some embodiments, automatic detection of one or more objects does not require manual input and the system automatically identifies where these objects are on a screen or in an image, after which the camera projection matrix can be computed. Automatic calibration can be used in some examples. Fully manual, fully automatic and hybrid calibration methods can be used in some examples.

In embodiments where the camera is handheld or not completely stable, a camera projection matrix per frame may be computed for high accuracy tracking. In one possible embodiment, this can be obtained by running the aforementioned method on each frame of the video separately to obtain a projection matrix per frame. Alternatively, this may be done on intermittent frames, called keyframes, and the camera calibrations for non-keyframes can be obtained by using optical flow from the keyframes or another similar algorithm which may use the apparent motion of the camera.

Figure 3:
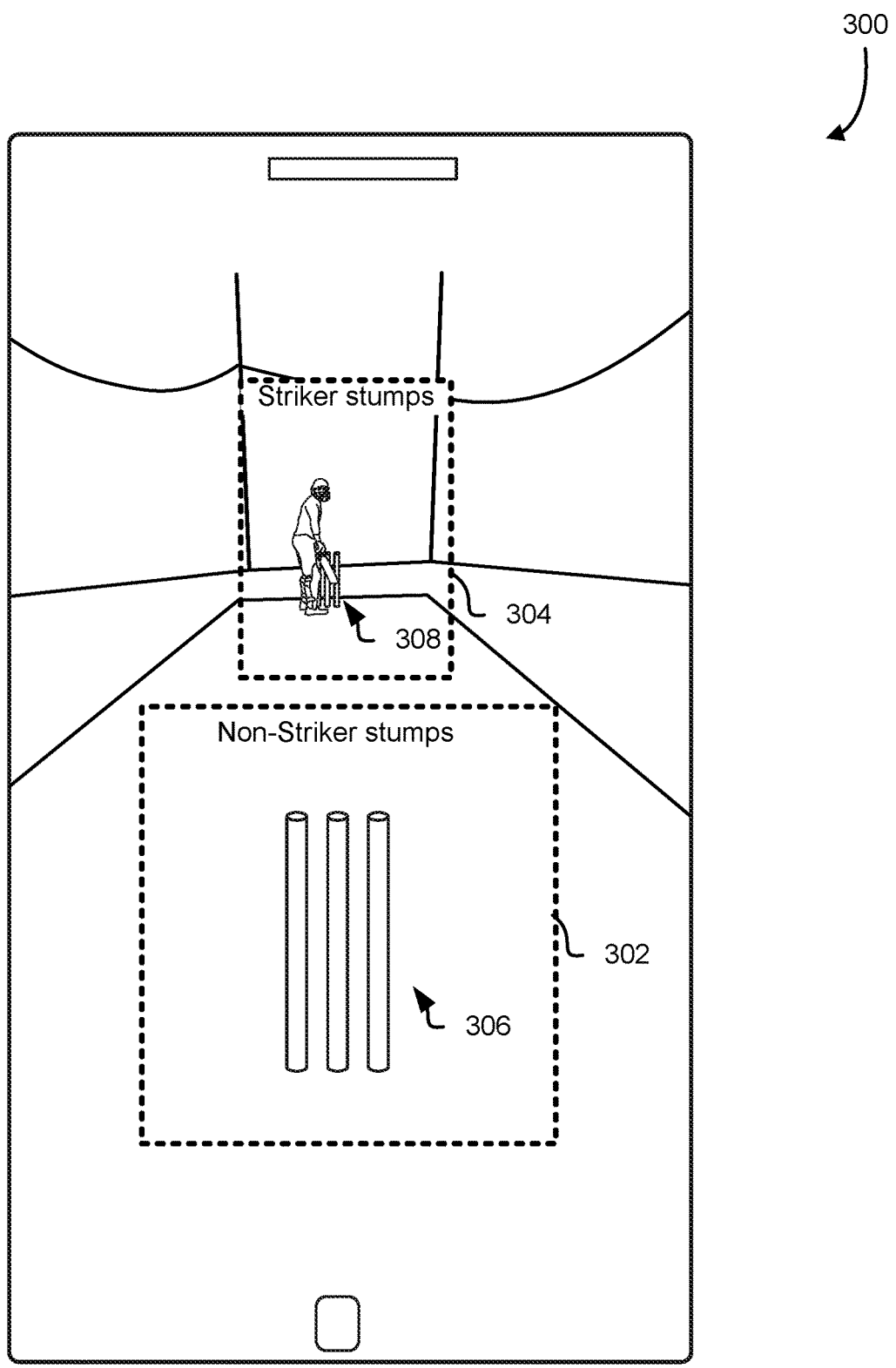
FIGS. 3-5 illustrate example steps in a process to determine a projection matrix for a view in a gaming environment, which may be performed by the device/system of FIG. 2, according to at least one embodiment.
Figure 4:
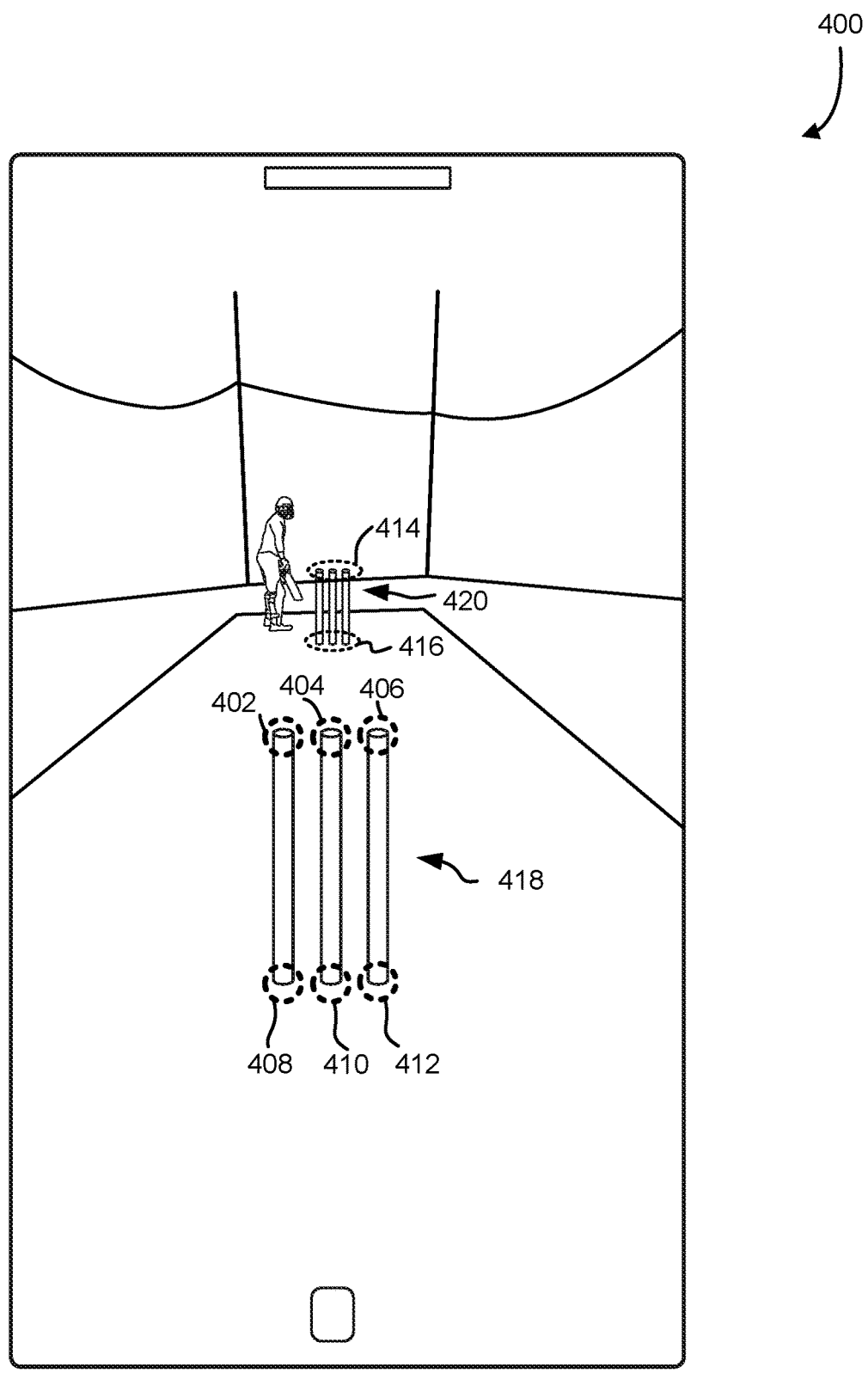
Figure 5:
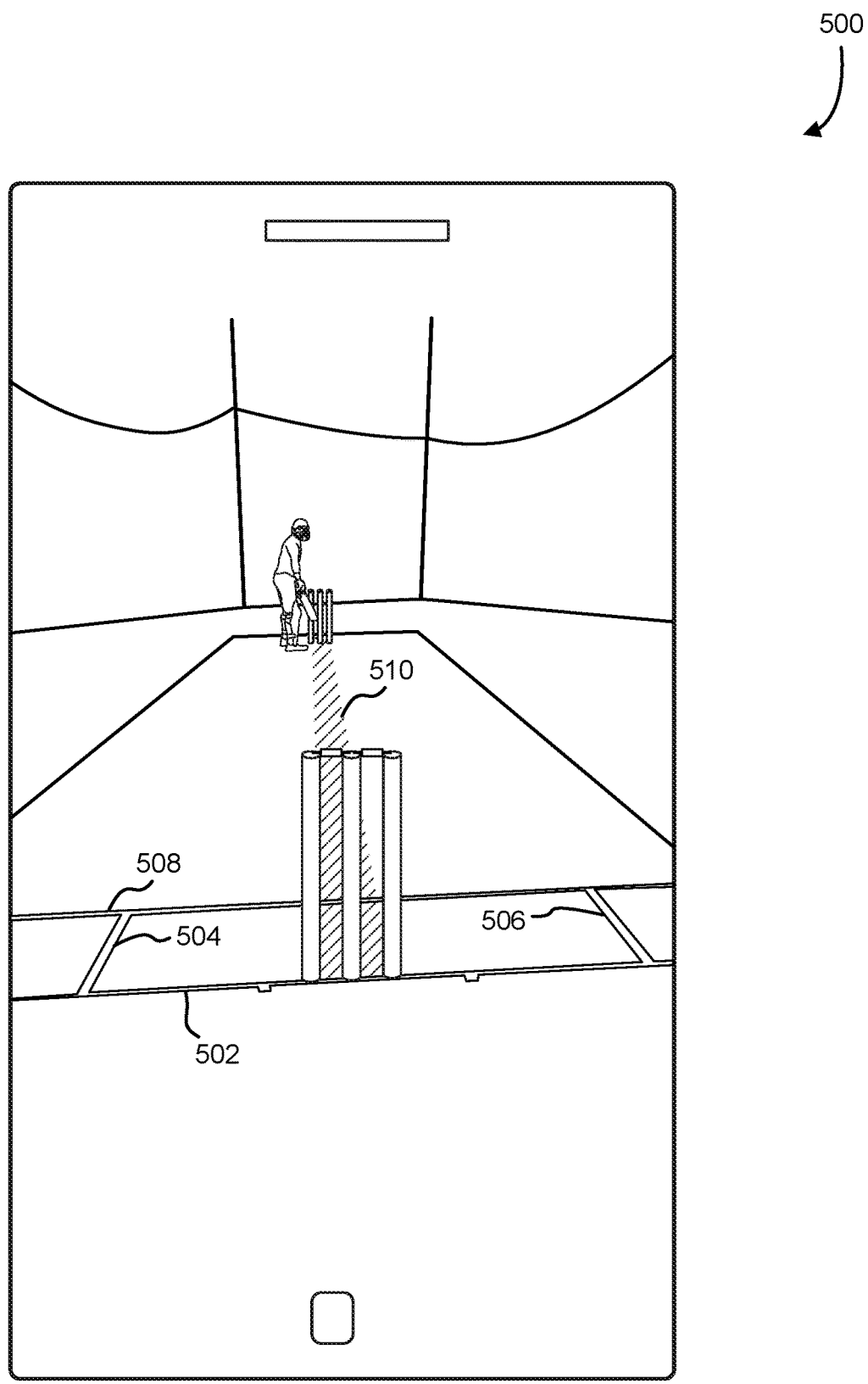

FIGS. 3-5 illustrate example steps in a process to determine a projection matrix for a view in a gaming environment, which may be performed by the device/system of FIG. 2, and/or more specifically by the camera projection matrix generation process 208. In some cases, the example steps/views 300-500 of a camera calibration or camera projection matrix generation process may be performed in part or in response to inputs from a user of a user device, such as user device 102/202. In some optional aspects, bounding boxes or areas may be known or determined that typically contain certain features of the gaming environment, such as bounding boxes 302, 304 illustrated in view 300 of FIG. 3. These areas may be used to focus a search or analysis of the pixels within these areas to identify the stumps 306, 308 in a cricket game (or alternatively for other points in different types of gaming environments). In some aspects, these bounding boxes may be auto generated and/or input or modified by a user, such as via GUI 228 of a user device 202 used to capture video of game action. In some aspects, the bounding boxes 302, 304 may be drawn, moved, or modified in one or more dimensions by a user using a touch screen GUI. In other aspects, the bounding boxes may be auto generated by the video recording and segmentation system 206 and/or camera projection matrix generation process 208, and invisible or hidden to a user.

FIG. 4 illustrates the identification, shown by dotted circles 402-406, 408-412, and 414, 416, respectively, around the tops and bases of the bowler and batter stumps 418, 420 (only two dotted circles 414, 416 are illustrated for clarity with respect to batter stumps 420; however, it should be appreciated that in some cases, the top and bottom of each batter stump 420 may be individually identified or the top and bottoms of each of the bowler and batter stumps 418, 420 may be used to a similar effect. Via identification of the 2D locations (e.g., pixel space locations) of the tops and bottoms of the bowler and batter stumps 418, 420, the location of the stumps in the 2D image (pixel locations) and in 3D (known real world position in meters) can now be correlated. With this correlation, linear algebra may be used o find this projection matrix. For example, the system has now determined a set of 2D→3D correspondences. For example, the top of the middle stump which has 3D point (0, 0.7, −10) corresponds to image point (250, 400). For each correspondence, 3D and 2D point, $x_i \in R^3$ $y_i \in R^2$ are now known.

The system can solve for a camera matrix which minimizes the reprojection error from the 3D real world point to the detected point in 2D, represented by the following:

$$C = \text{Argmin}_c \sum_i (\text{Projection}(x_i) - y_i)^2$$

This equation may be solved using, for example, the Ceres library, and/or the Levenberg-Marquardt algorithm, as are known by those having ordinary skill in the art.

In some cases, a RANSAC technique, or other equivalent technique, may be used to remove outliers (incorrect stump detections). With this projection, a virtual world may be constructed that completely aligns with the user's screen, as illustrated in view 500 of FIG. 5. In the example of view 500, court lines or other similar features 502, 504, 506, 508, 510 may be identified via the techniques described above and/or overlaid onto the image of the gaming environment to provide points of reference for a user to more clearly interpret captured game play. This generated virtual world also enables tracking the ball in 3D, as opposed to only doing tracking in 2D.

As described above, the projection matrix or model, such as generated by system/process 208, may enable identification of the 2D pixel coordinates of the stumps on the phone screen, where the position of the stumps on screen can be used to establish an understanding or mapping of the 3D world.

As illustrated, video recording and segmentation system 206 may also include various processes to determine one or more frames of interest (FOI) and trigger recording/saving of video segments or chunks. These processes may include a 2D pose estimation process 210, a 3D pose coordinate estimation process 212, a FOI identification process 214, and a trigger classification process 220, as will be described in greater detail below. In some cases, the segmented videos may be saved in a collection of saved video segments 226 stored by a data storage device 222. In some aspects the data storage device 222 may include any of a variety of data storage devices, such as may be co-located with the user device 202 or may be remotely located, such as provided by one or more servers or cloud computing resources, accessible to the user device 202 over one or more networks. In some aspects, the storage device 222 may also store video in a temporary video buffer 224, which may include any type of data storage that stores data for a limited amount of time. In some aspects, the storage device 222 may also include one or more neural networks 228, such as may be used by any of processes 208, 210, 212, 214, 216, 218, and/or 220, as will be described in greater detail below.

In some cases, the 2D pose estimation process 210 may be executed by the video recording and segmentation system 206 to identify one or more humans in frames of video. Identification of humans by the 2D pose estimation process 210 can include performing a computer vision algorithm (e.g., pose estimation) on the frames of an input video. Pose estimation algorithms can be desirable to concurrently identify the presence of a human being and estimate the 2D image locations (e.g., in pixel coordinates) of one or more key body parts of the person, which can be referred to as the pose coordinates. Such body parts can include any suitable part or portion of the body or clothing, such as the feet, torso, hands, eyes, and nose of each person in the view of the capture device, and the like.

Any suitable pose estimation algorithm can be used in various embodiments, as are known in the art, and such algorithms can be developed or trained for a specific sport, sporting environment, or the like. In example implementation of an embodiment, various numbers of frames (e.g., 100's to 1000's or more) may be manually annotated specifically for a given sport/gaming environment where the body position of each person in the image is manually marked. This data may be used to improve upon various pose estimation algorithms such as a the mobile PoseNet algorithm, by training one or more neural network on these specific images of the sport. In the example of cricket, the arm of a bowler may be manually annotated in a number of different frames and positions within those frames to develop a robust neural network that can detect when a bowler's arm is raised, thus indicated that the bowler is about to pitch the ball. Similarly, the identification of feet of the bowler may similarly be trained to determine when a bowler is in a position to bowl or pitch the ball. As can be seen by the example above, a number of different parts of a human may be identified to correlate to certain activities or events within a given sport or gaming environment (arms, head, feet, etc., to indicate the swing of a golf club, pitch of a baseball, throw of a basketball and so on).

Figure 6:
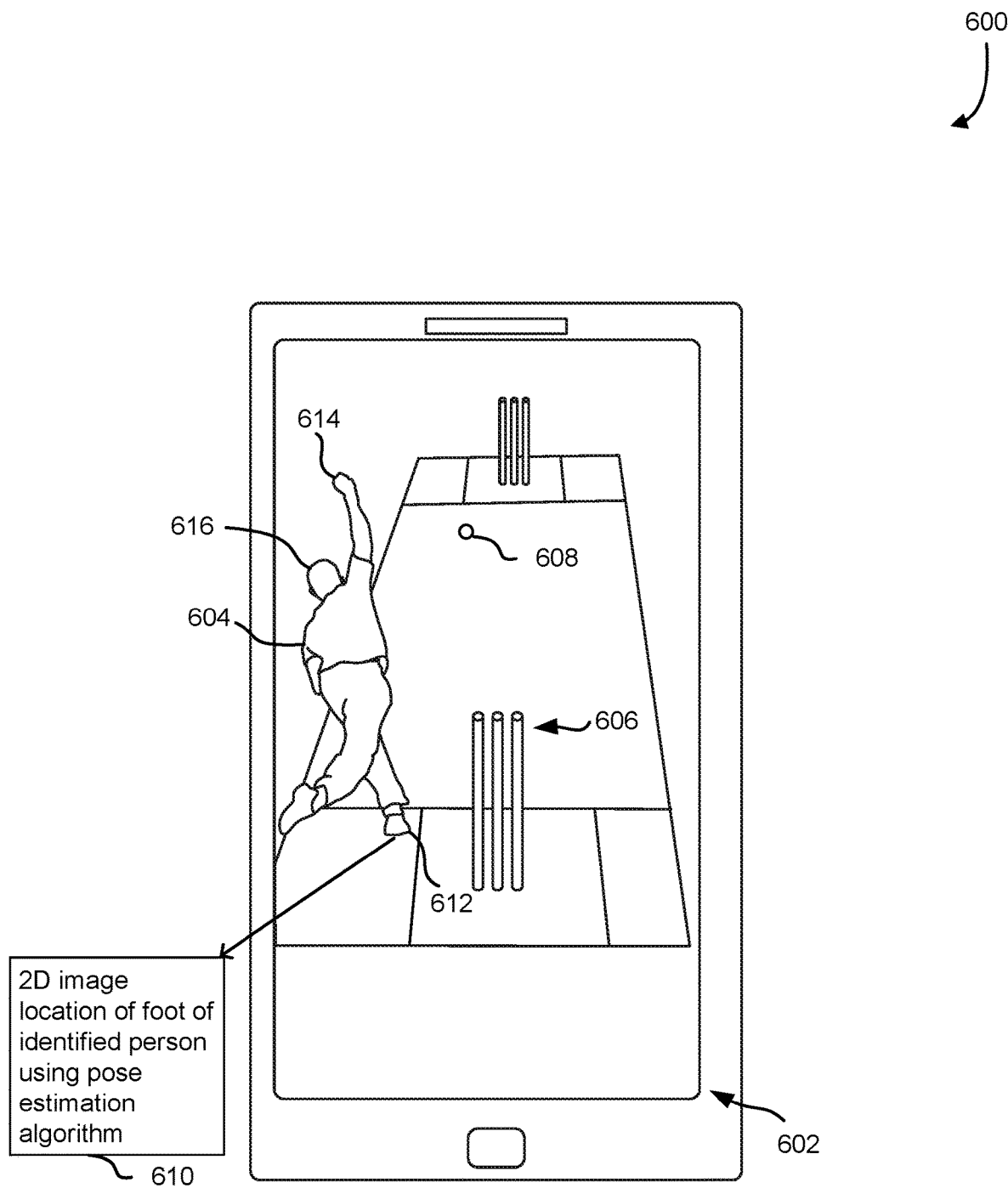
FIG. 6 illustrates an example view of the 2D location estimation performed by the device of FIG. 2, according to at least one embodiment.

FIG. 6 illustrates an example view 600 of the 2D location estimation performed, for example, by the video recording and segmentation system 206 and/or the 2D pose estimation process 210 of FIG. 2. View 600 may include a frame of a gaming environment 602 that includes a bowler 604 next to bowler stumps 606, pitching a ball 608. Using the techniques described herein, such as a neural network trained on similar frames as illustrated in view 600, the location 610 of the foot 612 of the bowler 604 may be identified as a part of a detected human (e.g., the bowler 604) that has significance, particularly when positioned proximate to the stumps 606. In other examples, the position of the hand 614 (such as the pitching hand) of the bowler 604, may also be identified as a point of significance, for example because of its relationship as being above the head 616 of the bowler 604.

In some cases, the 3D pose coordinate estimation process 212 may be executed by the video recording and segmentation system 206 to map the 2D pixel coordinates, obtained from frames of a video, to real world 3D coordinates, using the camera projection matrix determined by the camera projection matrix process 208. Estimation of a real-world location of at least one identified human in at least one frame of an input video can be achieved in some examples by using pose coordinates of identified persons and a previously calculated camera projection matrix. The projection matrix can allow the system to project a 2D point onto a 3D plane, which can provide an estimation of the real-world location of the 2D image point. In one embodiment, the 2D point used to estimate location is the 2D pose coordinate of the foot of an identified person, which is projected onto the ground plane of the real-world coordinate system; however, but it may be another body part in other embodiments or other 3D planes.

Figure 7:
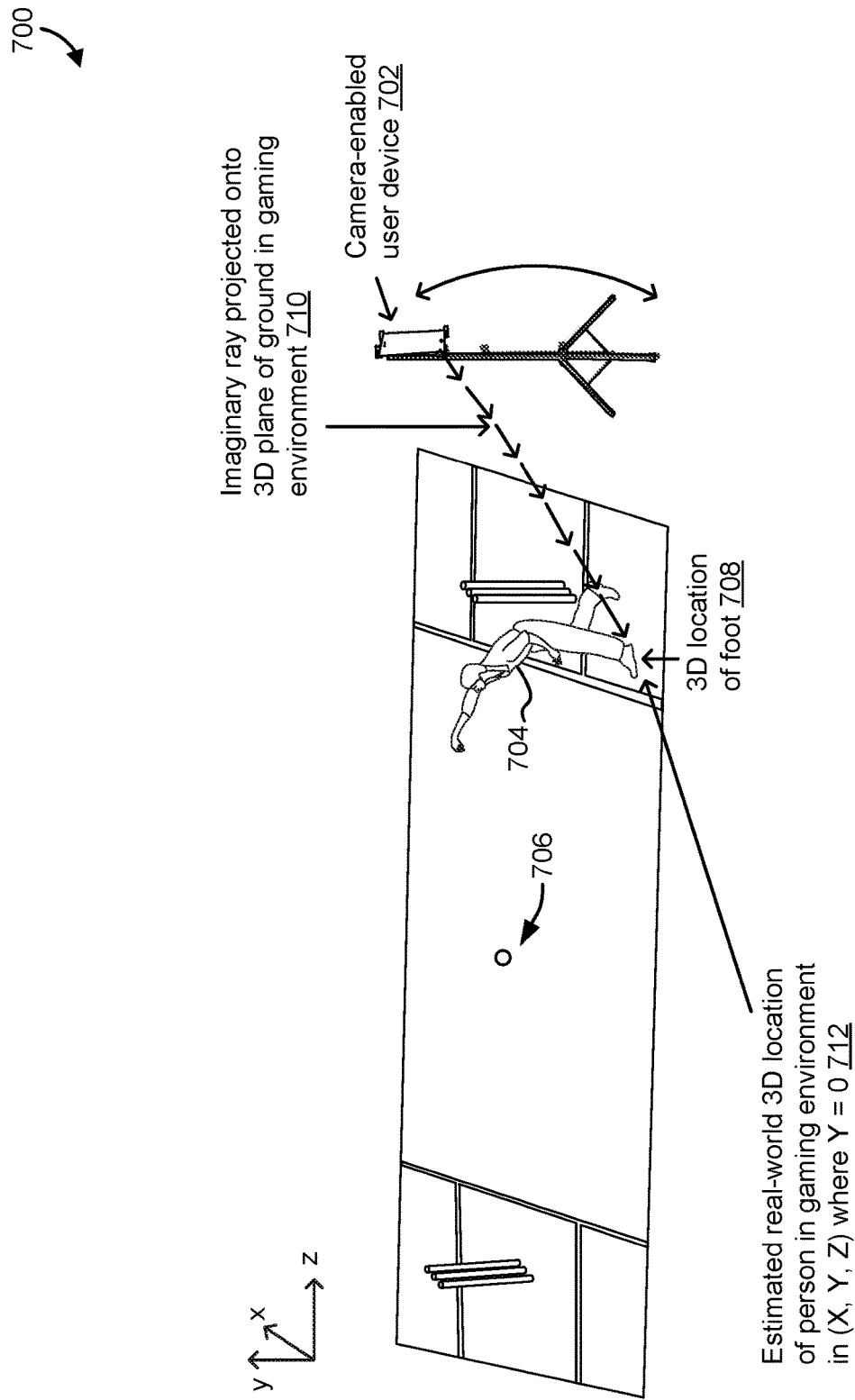
FIG. 7 illustrates an example of a 3D location estimation using a camera projection matrix and 2D image coordinates illustrated in FIG. 6, according to at least one embodiment.

FIG. 7 illustrates an example diagram 700 of a 3D location estimation using a camera projection matrix and 2D image coordinates illustrated in view 600 of FIG. 6. As illustrated in diagram 700, a camera 702 may capture a frame, such as the frame illustrated in view 600, of a bowler 704 throwing a ball 706, where the path from the camera device 702 to the location 708 of the foot of the bowler 704 is illustrated as path 710. The 3D pose coordinate estimation process 212 may determine a real world 3D location of the foot of the bowler, represented by x, y, z, coordinates 712, where y=0.

In some cases, the FOI identification process 214 may be executed by the video recording and segmentation system 206 to identify frames of interest or frames that contain actions or events of interest. In some cases, the FOI identification process 216 may include one or more of a POI identification process 216 and/or an ROI identification process 218. Various embodiments can include determining whether the estimated locations of identified persons are in a predefined Region Of Interest (ROI) for at least one frame of the input video. Such regions can be defined based on a given sport, sporting environment, or the like. For instance, in baseball, the pitcher pitches from near the mound and the ROI could be a circle of defined radius on the ground plane with the mount as the center. If a person's 3D real-world location is estimated to be within the ROI, the person can be defined as a Person Of Interest (POI). If a frame of the video contains at least one POI, the frame can be defined as a Frame Of Interest (FOI).

Figure 8:
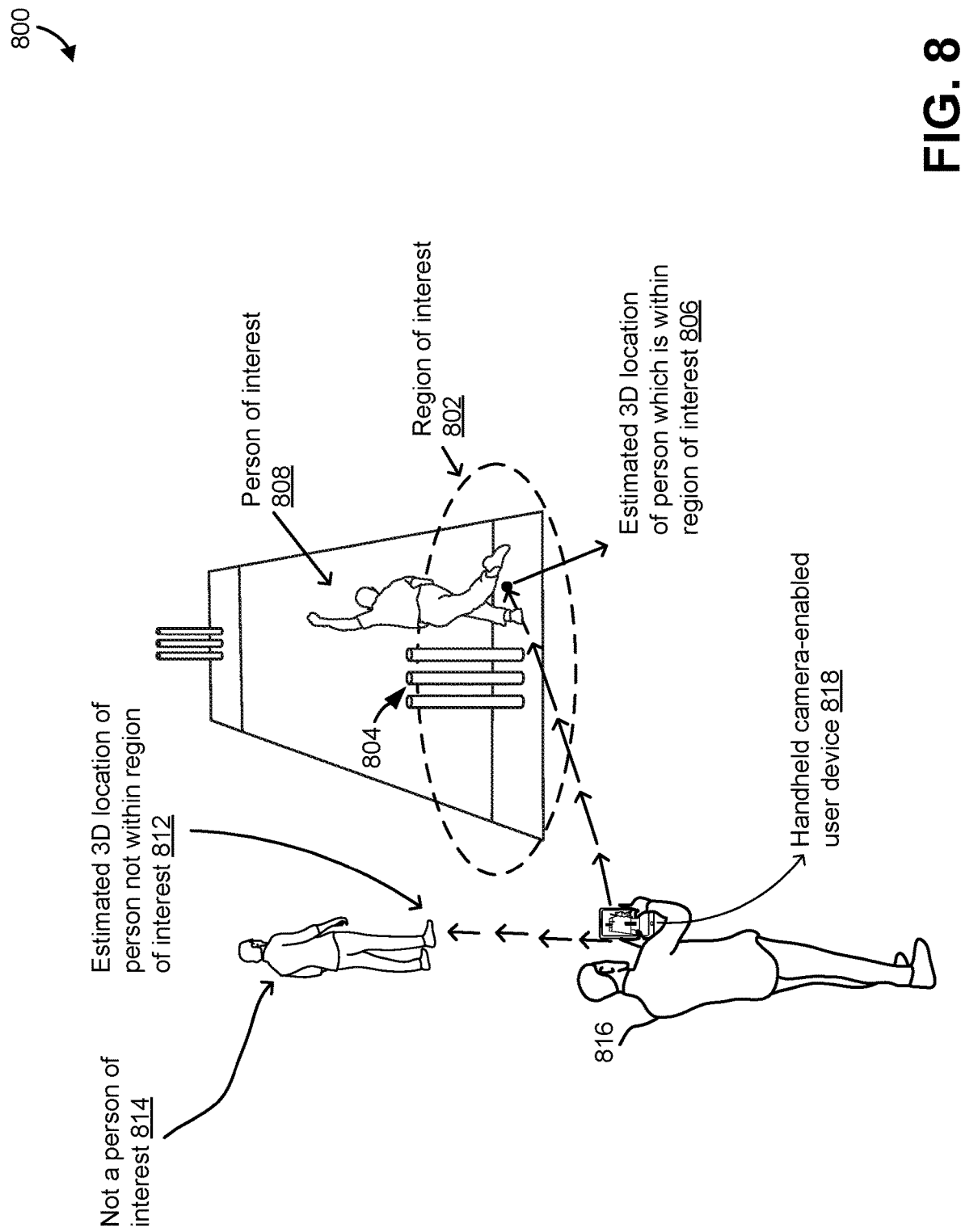
FIG. 8 illustrates an example diagram of a process for determining 3D locations of a person of interest in a region of interest in a gaming environment, according to at least one embodiment.

FIG. 8 illustrates an example diagram 800 of 3D locations of POIs and ROIs in a gaming environment, such as may be captured by a user 816 holding a camera enabled user device 818. As illustrated, an ROI 802 may be defined, such as through one or more neural networks, as including a box or circle (or any other 2D area or 3D volume or space) around the bowler stumps 804. A person, e.g., bowler, may be determined, via the 2D pose estimation process 210 and the 3D pose coordinate estimation process 212, to have a 3D location 806 that falls within the ROI 802, and thus may be characterized as a person of interest 808. In other cases, a person may be identified, but because their estimated 3D location 812 does not fall within a ROI, they may be determined to not be a person of interest 814, and be disregarded for purposes of determining whether a given frame is a FOI that would otherwise trigger recording the video segment and saving the video segment for future access and/or retrieval.

In some cases, the trigger classification process 220 may be executed by the video recording and segmentation system 206 to detect and classify a movement by a POI as a triggering event to begin recoding a video segment. In some cases, the triggering event may cause the system 206 to retrieve frames that have already been captured by the camera 204 and save those frames, along with future frames, in a more permanent video storage, such as in saved video segments 226. A trigger movement can be defined as an identifiable movement that marks the start of a sporting action that is desired to be recorded. This could be a cricket or baseball pitcher starting their pitching action, a football center snapping the ball to the quarterback, or a tennis player starting a serve, and so on. Such a trigger movement can be identified in some examples by performing a machine learning algorithm that compares the pose coordinates of the POI in a subset of frames of the input video to periodic, predictable poses of persons in the real-world when they perform movements that trigger the beginning of a play/shot/hit in the particular sport. For instance, for baseball, the input to the machine learning algorithm could be the pose coordinates of a POI from only the FOI and the machine learning algorithm could classify whether or not these pose coordinates represent a pitcher initiating a pitch.

In order to train such a machine learning algorithm, in various embodiments, data regarding trigger motions and non-trigger motions can be collected and annotated. For example, in an implementation of one example embodiment for cricket, thousands of body positions may be collected and labeled as comprising a trigger or non-trigger position of the bowler initiating a throwing motion. A machine learning algorithm is then trained on this data and learns to classify trigger vs non-trigger body positions. Such a machine learning architecture in some examples can be a fully connected neural network that takes the body position of the POI and returns a single value between (0,1), indicating the probability that such a body position comprises a trigger movement. If the resulting probability is above a defined threshold, the pose is considered a trigger movement.

In some embodiments, a system can use simple heuristics on the body pose without requiring machine learning. For example, a body position could be classified as a pitching trigger movement by simply identifying whether the hand is above the head. Such a method may not require training data or machine learning, but in some examples may require known heuristics about the sport and the desired trigger movement.

In other embodiments, a frame may be classified as a frame-of-interest without directly requiring the pose coordinates of a human or the camera projection matrix. In one such embodiment, a neural network such as a Convolutional Neural Network, may be used directly on each frame or a sequence of frames to predict whether a given frame represents the start of a trigger movement. In one embodiment for cricket, a convolutional neural network based on the MobileNet architecture, or other similar architecture, takes three consecutive frames and directly predicts whether the middle frame is the beginning of a desired sports action such as a cricket bowling action. In order to train this network, several thousand frames were annotated as either the start of a sports action or not, and the neural network was trained on these examples.

In various embodiments, the method can further include triggering the writing and storage of the input video, for a defined length of time, on the user device. In some embodiments, this can be done when the POI's pose coordinates across the subset of frames, including at least the FOI, are classified as a trigger movement. In other embodiments, this can be done based on a neural network classifying a given frame as the start of a desired trigger movement. Additional embodiments of the algorithm may use a machine learning algorithm on a POI to determine when to stop the recording, instead of always recording for a fixed amount of time. Further embodiments include saving a fixed duration video that occurs before the trigger frame by maintaining a continuous history of video in a ring buffer and writing these frames when a trigger movement is identified.

In some cases, the trigger classification process 220 may output an instruction to the storage device 222 to begin saving frames of a video input from the camera 204. In yet some cases, video may constantly be recorded by camera 204 and may be temporarily stored in a temporary video buffer 224. In some cases, video may only be stored in the temporary video buffer for a set period of time (e.g., 1, 2, 5, 10, 15 seconds, to a minute, 5 minutes, etc.), such as to enable processing of the video to determine if it is deemed to satisfy one or more conditions for more permanent storage. In these examples, a constant lag (e.g., 0.5-1, 2, 3, seconds and so on) between when the video input is recorded and temporarily stored and when it is processed to determine if a triggering event has occurred may be maintained, for example, to ensure the begging of important video is not lost (e.g., not saved more permanently) due to processing delays.

Figure 9:
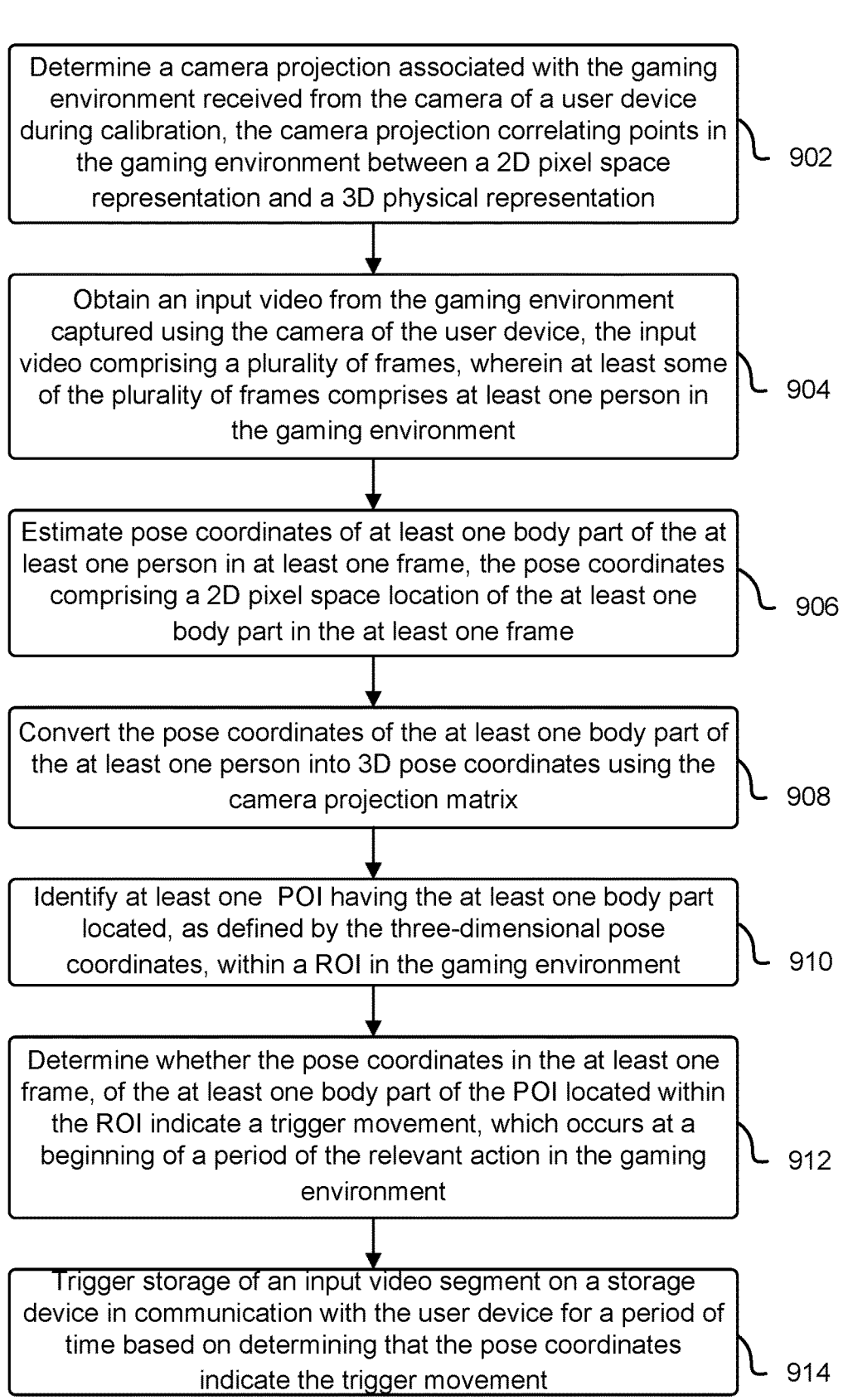
FIG. 9 illustrates an example process for recording and saving segments of video based on events detected in the video, according to at least one embodiment.

FIG. 9 illustrates an example process 900 for determining a relevant action in a gaming environment to automatically trigger recording of video on the camera of a user device. In some examples, process 900 may be performed by the video recording and segmentation system 206 and various process described in relation to the video recording and segmentation system 206 in reference to FIG. 2.

Process 900 may begin at operation 902, in which a camera projection associated with the gaming environment received from the camera of a user device during calibration may be determined. In some cases, the camera projection correlates points in the gaming environment between a two-dimensional pixel space representation and a three-dimensional physical representation. In some cases, operation 902 may include generating a camera projection matrix associated with the plurality of frames of the input video and the gaming environment by identifying at least four points in the gaming environment that have a fixed dimensional relationship with each other and correlating the at least four points between a two-dimensional pixel space representation and a three-dimensional physical representation.

In some cases, such as when the camera is stationary, one camera projection matrix may be used for a number of frames or all frames of a video. In other cases, such as when the camera is not stationary, multiple matrices may be obtained or determined, such as for every frame (e.g., when the camera is moving a lot or when accuracy is important), or for a subset of frames or key frames (frames selected to represent the video, such that may be selected to correspond to every other, every $3^{rd}$, every 5 frame and so on). In some cases, a plurality of camera projection matrices may be obtained or generated, wherein individual camera projection matrices of the plurality of camera projection matrices are associated with individual key frames of the plurality of frames of the input video and the gaming environment, wherein generating an individual camera projection matrix comprises identifying at least two points in an individual key frame that have a fixed dimensional relationship with each other and correlating the at least two points between a two-dimensional pixel space representation and a three-dimensional physical representation.

Next, at operation 904, an input video may be obtained from the gaming environment captured using the camera of the user device, where the input video includes a plurality of frames. In some cases, at least some of the plurality of frames include at least one person in the gaming environment. At operation 906, pose coordinates of at least one body part of the at least one person in at least one frame of the plurality of frames may be estimated. The pose coordinates may include a two-dimensional pixel space location of the at least one body part in the at least one frame. In some cases, operation 906 may include performing a computer vision algorithm on the plurality frames of the input video to estimate pose coordinates of at least one body part of the at least one person in at least one frame of the plurality of frames. In some cases, the at least one body part includes a foot of the at least one person, and wherein converting the pose coordinates of the at least one body part of the at least one person into three-dimensional pose coordinates using the camera projection matrix further includes projecting the foot onto a ground plane defined in the three-dimensional physical representation. In yet some cases, converting the pose coordinates of the at least one body part of the at least one person into three-dimensional pose coordinates using the camera projection matrix further includes projecting the at least one body part onto a known plane defined in the three-dimensional physical representation.

At operation 908, the pose coordinates of the at least one body part of the at least one person (e.g., that are in two-dimensional space) may be converted into three-dimensional pose coordinates using the camera projection matrix. The three-dimensional pose coordinates may represent real-world dimensions of the gaming environment. At operation 910, at least one person of interest (POI) having the at least one body part located, as defined by the three-dimensional pose coordinates, within a region of interest (ROI) in the gaming environment may be identified.

In some cases, process 900 may additionally include performing the computer vision algorithm on the plurality frames of the input video to estimate pose coordinates of at least second one body part of the at least one second person in at least one frame of the plurality of frames, where the pose coordinates include a two-dimensional pixel space location of the at least one body part in the at least one frame. In some cases, process 900 may include determining that the at least one second person is not within the ROI such that the pose coordinates of the second person are not used to deterring whether a trigger movement has occurred.

In some cases, process 900 may include determining the ROI based on historical data relating to the gaming environment. In this example, process 900 may in some cases additionally include determining a second frame of interest in at least one second frame of a second plurality of frames using a convolutional neural network that determines whether a middle frame of three consecutive frames of the second plurality of frames indicates a trigger movement.

Next, at operation 912, it may be determined whether the pose coordinates in the at least one frame of the at least one body part of the POI located within the ROI indicate a trigger movement. A trigger movement may be defined by a pose or movement (e.g., change in pose) which occurs at during or at the beginning of a period of the relevant action in the gaming environment. In some cases, operation 912 may include performing a machine learning algorithm on the pose coordinates, in the at least one frame of the at least one body part of the POI located within the ROI to determine whether the pose coordinates indicate a trigger movement. In some cases, operation 912 may include classifying the pose coordinates of the at least one body part as indicating the trigger movement based on known heuristics relating to the gaming environment. In some aspects, the known heuristics comprise a special relationship between the pose coordinates of the at least one body part and pose coordinates of a second body part of the at least one person.

At operation 914, storage of an input video segment on a storage device in communication with the user device, such as for a period of time based on determining that the pose coordinates indicate the trigger movement may be triggered or caused. In some aspects, the input video segment includes a subset of the input video. In some cases, a length of the input video segment may be selected based on detecting a second triggering movement in the video input (e.g., a batter missing the ball, the ball being thrown back to the pitcher or bowler, etc.), and/or based on a predefined length associated with the triggering movement or the gaming environment.

In some examples, one or more of the following may be true in relation to performance of process 900: the gaming environment comprises a cricket gaming environment, the at least four points comprise tops and bottoms of at least two stumps in the cricket gaming environment, the ROI comprises an area surrounding bowler stumps, or the trigger action comprises a throw of a ball.

In some examples process 900 and/or other aspects of the techniques described herein may be performed for any moving object in a multitude of different environments, such as traffic accident detection and analysis, military applications, such as detecting projectiles, or other flying objects, civilian flying object analysis, such as plane travel, drone travel, security monitoring, and so on.

Some embodiments can include a method for determining a relevant action in a gaming environment to automatically trigger recording on the camera of a user device, the method comprising: determining a camera projection on the basis of at least four reference points associated with the gaming environment that are received from the camera of a user device during calibration; receiving an input video from the gaming environment captured using the camera of the user device that comprises at least one person in the gaming environment; performing a computer vision algorithm on the frames of the input video to estimate the pose, the 2D image locations of at least one body part, of the at least one person in the gaming environment and using the image location of this body part, alongside the camera projection, to estimate the real-world location of the at least one person in the gaming environment; identifying at least one person of interest as those amongst the aforementioned at least one person whose estimated real world locations are, for at least one frame, within a predefined region of interest in the gaming environment; performing a machine learning algorithm on the image locations, in at least one frame, of the body parts of each person of interest to classify their pose as a trigger movement which occurs at the beginning of a period of relevant action in the gaming environment; and triggering the writing and storage of the input video on the user device for a predefined length of time if the pose of a person of interest or frame is classified as a trigger movement across a subset of at least one frame of the input video. In some aspects, alternatively to determining a triggering movement occurs by a person of interest located within a region of interest, one or more neural networks may be used directly on the frames to classify whether a given frame comprises a trigger movement in a frame-of-interest. In some embodiments, computation of a camera projection can be on the basis of at least any suitable number of reference points including, 1, 2, 3, 4, 5, 6, 7, 8, 9, 10, 15, 25, and the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A method for determining a relevant action in a gaming environment to automatically trigger recording of a camera of a user device, the method comprising:
   determining at least one camera projection matrix on the basis of at least four reference points associated with the gaming environment received from the camera of a user device during calibration, the at least one camera projection matrix correlating the at least four reference points between a two-dimensional pixel space representation and a three-dimensional physical representation;

obtaining an input video from the gaming environment captured using the camera of the user device, the input video comprising a plurality of frames, wherein at least some of the plurality of frames comprises at least one person in the gaming environment;

identifying at least one person of interest (POI) having at least one body part located within a region of interest (ROI) in the gaming environment using a convolutional neural network;

performing a machine learning algorithm on the pose coordinates, in the at least one frame, of the at least one body part of the POI located within the ROI to determine whether the pose coordinates indicate a trigger movement, which occurs during a period of the relevant action in the gaming environment; and triggering storage of an input video segment that includes the trigger movement, on the user device for a period of time based on determining that the pose coordinates indicate the trigger movement, wherein the input video segment comprises a subset of the input video, wherein at least two of: the gaming environment comprises a cricket gaming environment, the at least four points comprise tops and bottoms of at least two stumps in the cricket gaming environment, the ROI comprises an area surrounding bowler stumps, or the trigger action comprises a throw of a ball.

2. The computer-implemented method of claim 1, wherein the at least one body part comprises a foot of the at least one person, and wherein converting the pose coordinates of the at least one body part of the at least one person into three-dimensional pose coordinates using the camera projection matrix further comprises projecting the foot onto a ground plane defined in the three-dimensional physical representation.

3. The computer-implemented method of claim 1, further comprising:
performing the computer vision algorithm on the plurality frames of the input video to estimate pose coordinates of at least second one body part of the at least one second person in at least one frame of the plurality of frames, the pose coordinates comprising a two-dimensional pixel space location of the at least one body part in the at least one frame; and
determining that the at least one second person is not within the ROI such that the pose coordinates of the second person are not used to deterring whether a trigger movement has occurred.

4. The computer-implemented method of claim 1, further comprising: determining the ROI based on historical data relating to the gaming environment.

5. The computer-implemented method of claim 4, wherein the at least one frame comprises a first frame of interest, wherein the method further comprises:
determining a second frame of interest in at least one second frame of a second plurality of frames using a convolutional neural network that determines whether a middle frame of three consecutive frames of the second plurality of frames indicates a trigger movement.

6. A computer-implemented method, comprising:
determining a camera projection matrix associated with the gaming environment received from the camera of a user device during calibration, the camera projection matrix correlating points in the gaming environment between a two-dimensional pixel space representation and a three-dimensional physical representation;

obtaining an input video from the gaming environment captured using the camera of the user device, the input video comprising a plurality of frames, wherein at least some of the plurality of frames comprises at least one person in the gaming environment;

identifying at least one person of interest (POI) having at least one body part located within a region of interest (ROI) in the gaming environment using a convolutional neural network;

determining whether the at least one body part of the POI located within the ROI indicates a trigger movement, which occurs at a beginning of a period of the relevant action in the gaming environment; and triggering storage of an input video segment that includes the trigger movement on a storage device in communication with the user device for a period of time based on determining that the pose coordinates indicate the trigger movement, wherein the gaming environment comprises a baseball gaming environment or a softball gaming environment, wherein the ROI comprises at least one of a pitcher's mound or an area around home plate, and wherein the trigger movement comprises a throw, a catch, or a hit of a baseball or softball.

7. The computer-implemented method of claim 6, wherein determining whether the pose coordinates in the at least one frame, of the at least one body part of the POI located within the ROI indicate the trigger movement comprises:
classifying the pose coordinates of the at least one body part as indicating the trigger movement based on known heuristics relating to the gaming environment.

8. The computer-implemented method of claim 7, wherein the known heuristics comprise a special relationship between the pose coordinates of the at least one body part and pose coordinates of a second body part of the at least one person.

9. The computer-implemented method of claim 6, further comprising:
performing a machine learning algorithm on the pose coordinates, in the at least one frame, of the at least one body part of the POI located within the ROI to determine whether the pose coordinates indicate the trigger movement.

10. The computer-implemented method of claim 6, wherein converting the pose coordinates of the at least one body part of the at least one person into three-dimensional pose coordinates using the camera projection matrix further comprises projecting the at least one body part onto a known plane defined in the three-dimensional physical representation.

11. The computer-implemented method of claim 6, wherein the input video segment comprises a subset of the input video.

12. The computer-implemented method of claim 11, further comprising:
selecting a length of the input video segment based detecting a second triggering movement in the video input.

13. The computer-implemented method of claim 11, further comprising:
selecting a length of the input video segment based on a predefined length associated with the triggering movement or the gaming environment.

14. The computer-implemented method of claim 6, further comprising:
selecting the ROI based on the gaming environment.

15. The computer-implemented method of claim 6, wherein the at least one frame comprises multiple frames of the plurality of frames.

16. A video recording and segmentation system, comprising:
a camera;
a display device;
one or more processors; and
memory in communication with the one or more processors, the camera, and the display device, that stores computer-executable instructions that, when executed, cause the one or more processors to:
obtain a camera projection associated with the gaming environment, the camera projection correlating points in the gaming environment between a two-dimensional pixel space representation and a three-dimensional physical representation;
obtain an input video from the gaming environment captured using the camera, the input video comprising a plurality of frames, wherein at least some of the plurality of frames comprises at least one person in the gaming environment;
estimate pose coordinates of the at least one person in at least one frame of the plurality of frames, the pose coordinates comprising a two-dimensional pixel space location of the at least one person in the at least one frame;
convert the pose coordinates of the at least one person into three-dimensional pose coordinates using the camera projection;
identify at least one person of interest (POI) being located the three-dimensional pose coordinates, within a region of interest (ROI) in the gaming environment;
determine whether the pose coordinates in the at least one frame of the POI located within the ROI indicates a trigger event, which occurs at a beginning of a period of the relevant action in the gaming environment; and
cause an input video segment that includes the trigger event to be stored in the memory, for a period of time based on determining that the pose coordinates indicate the trigger event, for future access via the display device, wherein the input video segment comprises a subset of the input video, wherein the gaming environment comprises a cricket gaming environment, and wherein the trigger movement comprises a throw, a catch, or a hit of a ball.

17. The video recording and segmentation system of claim 16, wherein the at least one frame comprises a first frame of interest, wherein the memory stores additional computer executable instructions that, when executed, further cause the one or more processors to:
determine a second frame of interest in at least one second frame of a second plurality of frames using a convolutional neural network that determines whether the second frame of interest indicates a second trigger event; and
cause a second input video segment that includes the second trigger event to be stored in the memory, for future access via the display device.

18. The video recording and segmentation system of claim 16, wherein the memory stores additional computer executable instructions that, when executed, further cause the one or more processors to:
classifying the pose coordinates of the at least one person as indicating the trigger event based on known heuristics relating to the gaming environment.

19. The video recording and segmentation system of claim 16, wherein the memory stores additional computer executable instructions that, when executed, further cause the one or more processors to:
perform a computer vision algorithm on the plurality frames of the input video to estimate pose coordinates of the at least one person in at least one frame of the plurality of frames.

* * * * *